United States Patent [19]
Iizuka et al.

[11] Patent Number: 5,122,888
[45] Date of Patent: Jun. 16, 1992

[54] FOCUSING PLATE HAVING PHASE GRATING FORMED BY USING LIQUID CRYSTAL

[75] Inventors: Kiyoshi Iizuka; Masahiro Fushimi, both of Yokohama, Japan

[73] Assignee: Canon Kabushiki Kaisha, Tokyo, Japan

[21] Appl. No.: 758,396

[22] Filed: Sep. 4, 1991

Related U.S. Application Data

[63] Continuation of Ser. No. 659,464, Feb. 25, 1991, abandoned, which is a continuation of Ser. No. 216,127, Jul. 7, 1988, abandoned.

[30] Foreign Application Priority Data

| Jul. 10, 1987 | [JP] | Japan | 62-172579 |
| Sep. 17, 1987 | [JP] | Japan | 62-230903 |
| Sep. 25, 1987 | [JP] | Japan | 62-238925 |
| May 12, 1988 | [JP] | Japan | 63-115300 |

[51] Int. Cl.⁵ ............ G02F 1/1343; G02F 1/1333; G02F 1/137
[52] U.S. Cl. .................. 359/54; 359/79; 359/89; 359/94; 359/95
[58] Field of Search .......... 350/339 R, 347 V, 347 R, 350/348, 336; 359/54, 79, 89, 93, 94, 95

[56] References Cited

U.S. PATENT DOCUMENTS

| 3,834,794 | 9/1974 | Soref | 350/336 |
| 3,843,231 | 10/1974 | Borel et al. | 350/348 |
| 3,856,381 | 12/1974 | Hedman, Jr. et al. | 350/348 |
| 3,883,227 | 5/1975 | Kobayashi et al. | 350/336 |
| 3,981,559 | 9/1976 | Channin | 350/336 |
| 4,023,890 | 5/1977 | Shirasu et al. | 350/336 |
| 4,251,137 | 2/1981 | Knop et al. | 350/347 V |
| 4,256,787 | 3/1981 | Shaver et al. | 350/339 F |
| 4,333,708 | 6/1982 | Boyd et al. | 350/346 |
| 4,387,965 | 6/1983 | Hara | 350/339 R |
| 4,389,096 | 6/1983 | Hori et al. | 350/339 R |
| 4,542,960 | 9/1985 | Yang | 350/336 |
| 4,606,612 | 8/1986 | Iizuka | 350/347 V |
| 4,617,646 | 10/1986 | Yang | 350/333 |
| 4,660,938 | 4/1987 | Kazan | 350/355 |
| 4,729,640 | 3/1988 | Sakata | 350/348 |
| 4,804,251 | 2/1989 | Jacobs | 350/392 |
| 4,834,506 | 5/1989 | Demke et al. | 350/333 |
| 4,836,657 | 6/1989 | Gunji et al. | 350/350 S |

OTHER PUBLICATIONS

Field Effects in Nematic Liquid Crystals Obtained with Interdigital Electrodes, R. A. Soref, Jour. of Applied Physics, vol. 45, No. 12, Dec. 1974.

Surface Reorientation Liquid Crystals Display Device, A. Aviram and G. L. Gladstone, IBM Technical Disclosure Bulletin, vol. 15, No. 6, Nov. 1972.

*Primary Examiner*—John S. Heyman
*Assistant Examiner*—Anita Pellman Gross
*Attorney, Agent, or Firm*—Fitzpatrick, Cella, Harper & Scinto

[57] ABSTRACT

A focusing plate comprising two base plates, a liquid crystal layer held between the two base plates, and an electrode pattern which is formed on each of the two base plates for the purpose of rotating the liquid crystal molecules in the liquid crystal layer by applying an electrical field to the liquid crystal layer; the electrode pattern being so formed that, when the electrical field is applied, the liquid crystal molecules are rotated by the leakage electrical fields from the electrode pattern to form a phase-type diffraction grating in the liquid crystal layer.

31 Claims, 17 Drawing Sheets

FOCUSING PLATE HAVING PHASE GRATING FORMED BY USING LIQUID CRYSTAL

This application is a continuation of application Ser. No. 07/659,464 filed on Feb. 25, 1991, which is a continuation prior application Ser. No. 07/216,127, filed on Jul. 7, 1988, both abandoned.

BACKGROUND OF THE INVENTION

1. Field of the Invention

The present invention relates to a focusing plate used in a single-lens reflex camera, and particularly to a focusing plate in which a phase grating is formed by rotating molecules of a liquid crystal by applying an electrical field to form a distribution of refractive indexes in a liquid crystal layer.

2. Description of the Prior Art

Hitherto, it has been previously known that a liquid crystal, particularly a scattering liquid crystal which is operated in a dynamic scattering mode, may be used in the focusing plate of a camera.

FIG. 1 is a sectional view of the configuration of a conventional scattering liquid crystal cell in which transparent electrodes 13, 14 made of thin films that consist of, for example, indium oxide and tin oxide are vapor-deposited over the entire inside surfaces of glass base plates 11, 12, respectively, and in which a liquid crystal layer 16 is sealed in a frame 15 held between the electrodes 13, 14. The two transparent electrodes 13, 14 are connected to a voltage power source 17 so that an electrical field may be applied to the liquid crystal layer 6 and a switch 18.

FIG. 2 shows the change that occurs in the vertical transmittance of white light L vertically incident upon the liquid crystal cell shown in FIG. 1 comprising a scattering liquid crystal with changes in the applied voltage.

Examples of conventional means for changing the scattering characteristics of a focusing plate using a liquid crystal cell include the method disclosed in Japanese Patent Publication No. 37379/1973 in which the whole of a focusing plate is changed from a transparent state to a diffused state by applying a voltage, and the method disclosed in Japanese Patent Laid-Open No. 15523/1975 in which the diffusing property is changed by changing the voltage to be applied.

The aforementioned scattering liquid crystal produces the effect of scattering light due to molecular groups of the liquid crystal in a turbulent state in the liquid crystal layer. The scattering liquid crystal therefore has a disadvantage in that, if the molecular groups of the liquid crystal producing such scattering effect are arranged in a finder with a magnification of several times such as the finder of a camera, the scattering can be seen by the naked eye even though the molecular groups have sizes of as small as several μm to several hundreds μm, Thus, a focusing plate is low in quality and scattering liquid crystal has not yet been put into practical use in a focusing plate.

SUMMARY OF THE INVENTION

Accordingly, the present invention was originated in view of the aforementioned problem of the conventional liquid crystal focusing plate, and it is an object of the present invention to provide a novel focusing plate of high quality which can obtain a desired diffusion characteristic.

To achieve this object, the present invention comprises a new method of forming a phase grating by utilizing a new liquid crystal. This new method of forming a phase grating is characterized by providing a liquid crystal layer in which the arrangement of the molecules of a liquid crystal are changed by applying an electrical field and electrodes which are disposed opposite to each other and sandwich the liquid crystal layer for the purpose of applying the electrical field to the liquid crystal layer and at least one of the electrodes having the form of a grating, and setting each of the electrodes in such a manner that an electrical field is produced in a non-electrode region without the portion between the opposed electrodes when the electrical field is applied to the liquid crystal layer from the opposed electrodes, the phase grating being formed by rotating the molecules of the liquid crystal and phase changes being produced in the non-electrode region.

A focusing plate of the present invention comprises a liquid crystal layer in which arrays that are substantially parallel with a pair of base plates are changed to arrays substantially vertical to the two base plates by applying an electrical field and electrodes which are respectively patterned on the two base plates with the liquid crystal layer held therebetween. In the focusing plate, the molecules of the liquid crystal are rotated by the electrical field produced between the electrodes by the voltage applied thereto from a means for applying voltage so as to provide phase changes with the changes in refractive indexes, as well as providing phase changes in a portion other than the portion between the electrodes by virtue of the leakage electrical field from the ends of the electrodes, whereby a periodic phase distribution (distribution of refractive indexes) is formed. It is particularly preferable that the periodic phase distribution is mainly formed in the region where changes of phase are produced by the leakage electrical field from the ends of the electrodes. Although the periodicity of the phase distribution depends upon the structures of the electrodes, it is preferable for the sake of the focusing plate that the width of each of the electrodes is within the range of 2 μm to the value of 1/5 of the period of the phase distribution or the period of the electrode arrangement.

A focusing plate in a form of the present invention comprises a liquid crystal layer in which arrays substantially parallel with a pair of base plates are changed to arrays substantially vertical to the two base plates by applying an electrical field, the two base plates holding the liquid crystal layer therebetween, and electrodes which are respectively patterned on the two base plates. This focusing plate is characterized in that a periodic phase distribution (distribution of refractive indexes) is formed by both the electrical field produced between the electrodes in the liquid crystal layer by the voltage applied to the electrodes from a voltage-applying means and the electrical field produced in a non-electrode portion in the liquid crystal layer by the voltage leaking from the ends of the electrodes so that the scattering characteristic of the liquid crystal is changed, the changes in the phase distribution on the periphery of the focusing plate being smaller than those in the central portion thereof.

Other characteristics and specific forms of the present invention will be made clear by the description of the embodiments given below.

DETAILED DESCRIPTION OF THE PREFERRED EMBODIMENT

Figure 1:
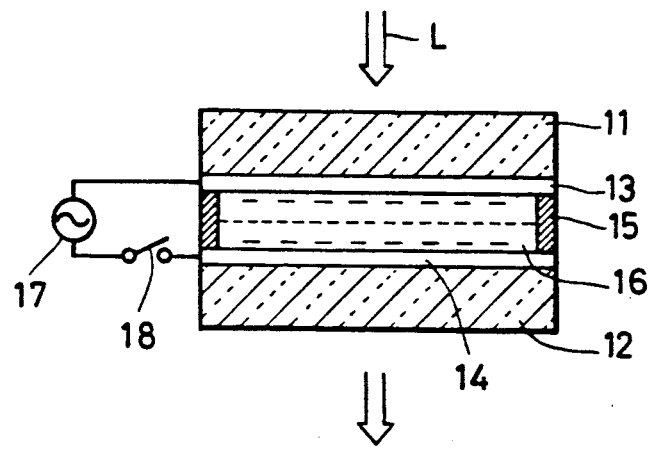
FIG. 1 is a sectional view of the configuration of a conventional scattering liquid crystal cell.
Figure 2:
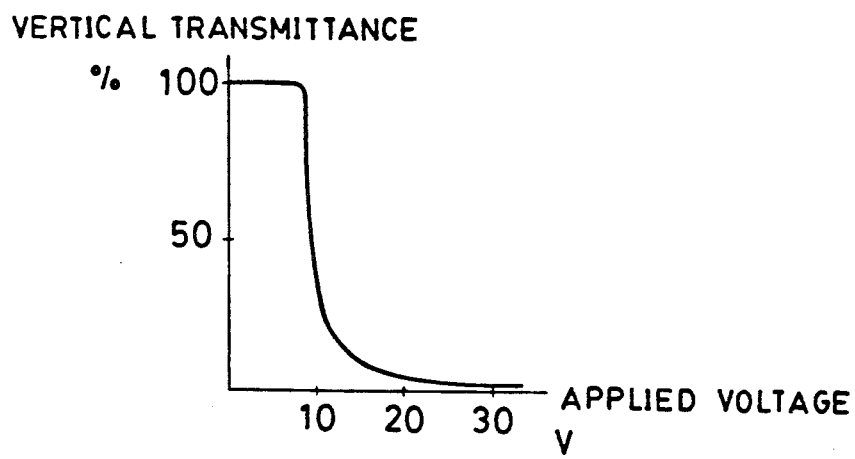
FIG. 2 is a graph showing the relationship between the voltage applied to the liquid crystal cell shown in FIG. 1 and the transmittance of vertical light.
Figure 3:
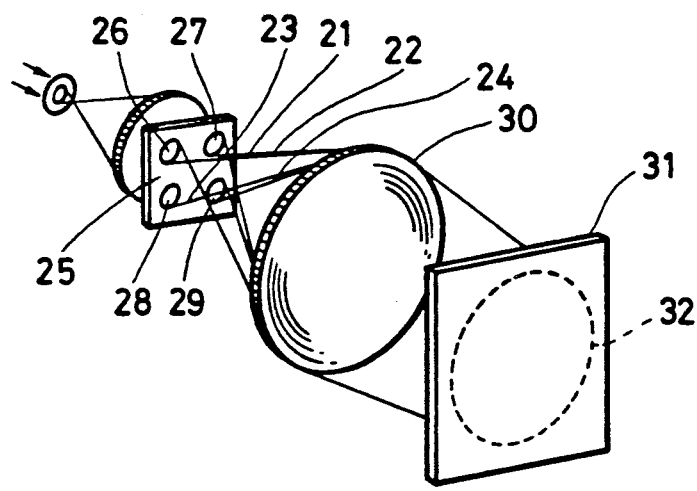
FIG. 3 is a perspective view of a conventional production optical system for producing a focusing plate having a phase-type diffractive grating.
Figure 4:
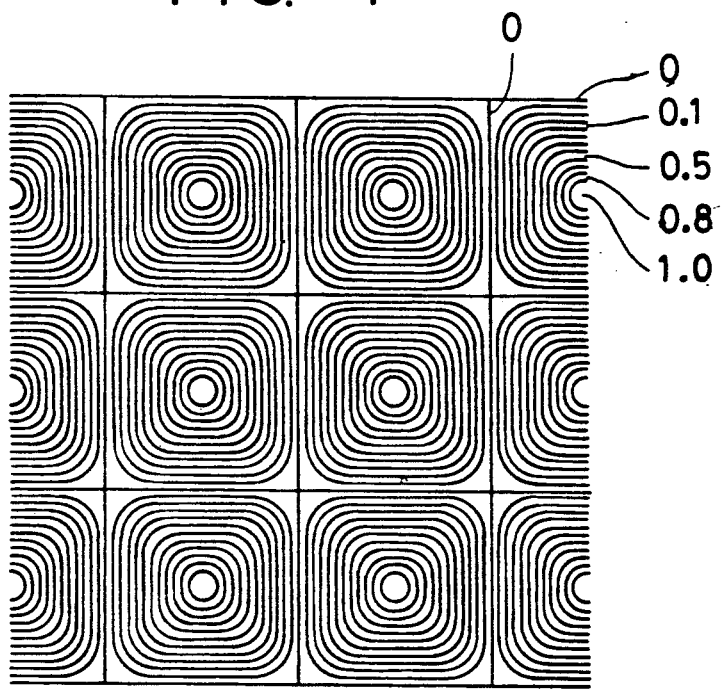
FIG. 4 is a contour map showing the strength distribution of the interference pattern formed on an optical recording material by the production optical system shown in FIG. 3.

FIG. 3 is a perspective view of a production optical system for producing a focusing plate having a general phase-type diffractive grating. In this system, four coherent light sources 21 to 24 disposed at the vertexes of a square are formed by lenses 26 to 29 which are held by a lens holder 25. Since the surface of the square defined by the positions of these four light sources is caused to coincide with the focal plane of a lens 30, four collimated light fluxes are emitted from the lens 30 and form a portion 32 on an optical recording material 31 where these four light fluxes overlap each other and produce interference fringes. The interference fringes can be drawn as contours of the strength distribution in a two-dimensional interference pattern, as shown in FIG. 4, in which, if the strength of each of the centers surrounded by the concentric contours is 1, the strengths of the contours in each of the mountains are 0.9, 0.8, . . . in the direction of moving toward the outer ring thereof, and the strength at each of the boundaries between the mountains on the square lines is zero. When the optical recording material used for recording with this strength distribution is a silver-salt sensitive material, various silver salt bleaching methods for changing the strength distribution into an uneven surface described by J. H. Altman in "Applied Optics" 5(10), 1689 (1966) are used.

Figure 5:
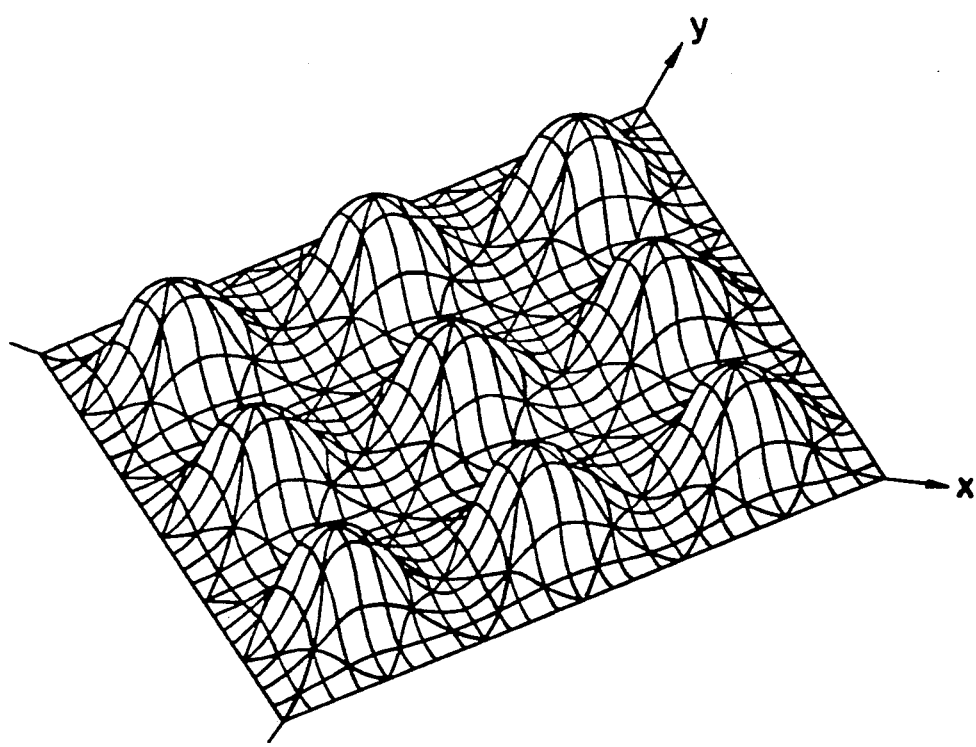
FIG. 5 is a perspective view of the relief pattern obtained from the interference pattern formed on an optical recording material by the production optical system shown in FIG. 3.

As described by R. L. Lamberts in "Applied Optics", 11(1), 23 (1972), in these methods, the strength distribution (exposure distribution) is changed into an uneven distribution in accordance with the following equation:

height of irregularity $\propto D$ (density) $\propto \log 10E$ (E: quantity of exposure). A perspective view of the uneven distribution (relief pattern) produced in this way is shown in FIG. 5. If the pitch of irregularity is about 5 to 50 $\mu m$ and the height of irregularity is about 1.5 to 2.3 $\mu m$, it is possible to provide a bright focusing plate for a camera which facilitates focusing.

Such a focusing plate having a phase-type diffractive grating was been disclosed in Japanese Patent Laid-Open Nos. 13436/1982 and 13474/1982 submitted by the applicant of the present invention.

The present invention provides a new focusing plate which is not a simple conventional focusing plate and which has a phase-type diffractive grating formed from a liquid crystal by utilizing the double refraction of liquid crystal molecules so that the diffusion property can be controlled by appropriately selecting the voltage to be applied.

A description will now be made of the refractive index changes of the liquid crystal used in the present invention.

A liquid crystal molecule shows a refractive index $n_e$ for light polarized in the direction of the long axis thereof, and a refractive index $n_o$ for light polarized in the direction of the short axis thereof. Consequently, the liquid crystal molecule may be optically represented as an ellipsoid of revolution having a long axis of $2n_e$ and a short axis of $2n_o$.

Figure 6:
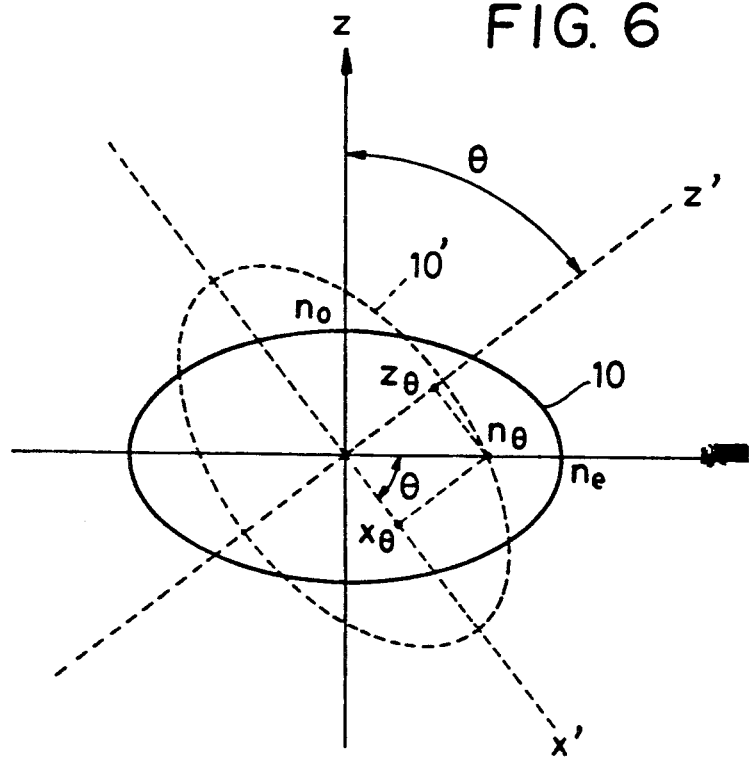
FIG. 6 is an explanatory view of the molecules of a liquid crystal.

FIG. 6 is an explanatory view of such a liquid crystal molecule in which reference numeral 10 denotes the liquid crystal molecule in a field-free condition, i.e., when no voltage is being applied, and reference numeral 10' denotes the liquid crystal molecule with its long axis rotated to the direction of an electrical field due in the dielectric anisotropy thereof when a voltage is applied. The degree of rotation is proportional to the strength of the electrical field applied, and FIG. 6 shows the state wherein the liquid crystal molecule is rotated $\theta°$. If a light ray is applied in the Z-axis direction, it can be considered that the incident light is divided into the polarized light component in the x-axis direction and the light component in the y-axis direction perpendicular to the x-axis, and the strengths of these components of natural light are the same.

As can be seen from FIG. 6, the liquid crystal molecule always shows the refractive index $n_o$ for the polarized light in the y-axis direction if the liquid crystal molecule is rotated. Thus, only the polarized light component in the x-axis direction is changed with the rotation of the liquid crystal molecule. In this case, a refractive index $n\theta$ is obtained as the values at the point of intersection of the ellipse and the x-axis. Consequently, if the projections of the refractive index n on the x'-axis and the z'-axis which are obtained by rotating $\theta°$ the x-axis and the z-axis are $x\theta$ and $z\theta$, respectively, since the liquid crystal molecule has an elliptic sectional form, the equations given below are established.

$$\frac{x\theta^2}{n_e^2} + \frac{z\theta^2}{n_o^2} = 1 \quad (1)$$

$$n\theta^2 = x\theta^2 + z\theta^2 \quad (2)$$

$$\sin\theta = z\theta/n\theta \quad (3)$$

From the above equations (1), (2) and (3), the refractive index $n\theta$ can be expressed by the following equation:

$$n\theta = \frac{n_e}{1 + \left(\frac{n_e^2}{n_o^2} - 1\right)\sin^2\theta}$$

Figure 7:
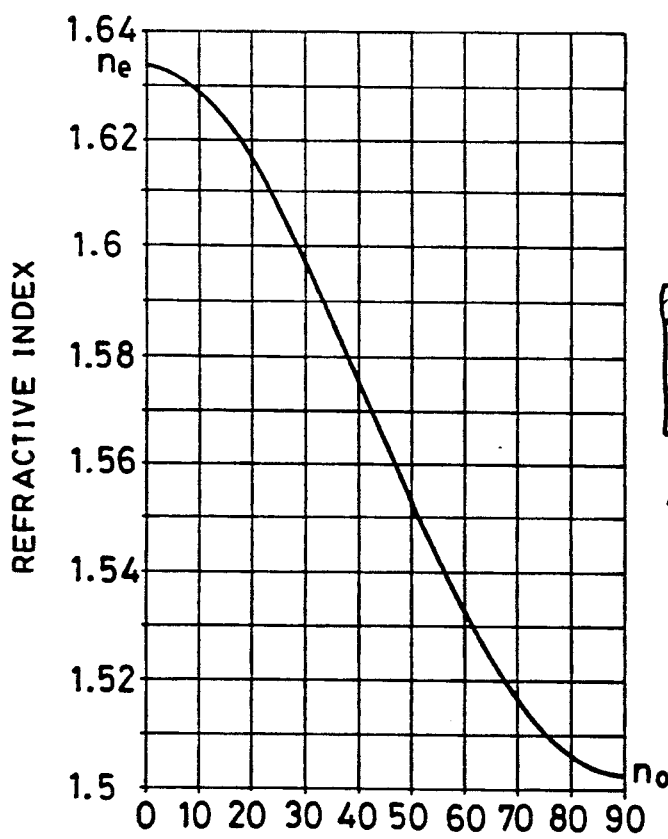
FIG. 7 is a graph showing the refractive indexes of a liquid crystal for the light polarized in the direction of the long axis of a liquid crystal molecule.

The refractive index n changes from $n_e$ ($\theta=0$) to $n_o$ ($\theta=90°$) with the rotation of the molecule. FIG. 7 is a graph showing the changes in the refractive index of a liquid crystal for linear polarized light polarized in the direction of the long axis of a liquid crystal molecule when nematic liquid crystal ZLI-1694 produced by Merck Co., Ltd. ($n_e=1.633$, $n_o=1.503$) is used.

Figure 8:
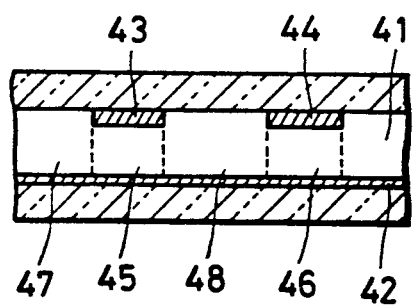
FIG. 8 is a sectional view of an example of a liquid crystal cell in which a phase-type diffractive grating can be formed.
Figure 14:
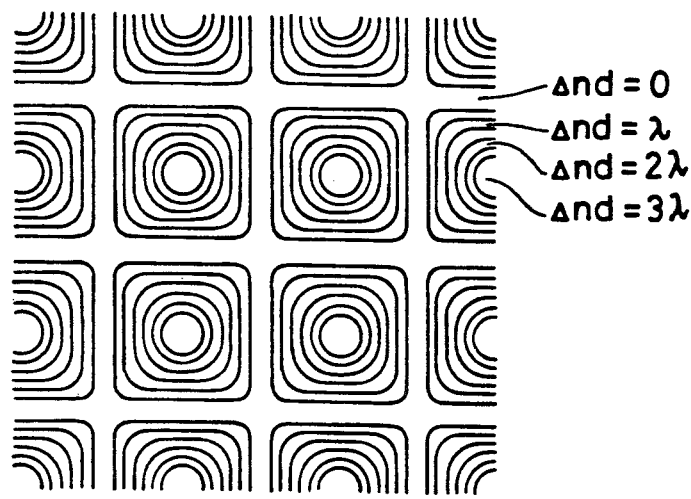
FIG. 14 is a contour map of the distribution of phase changes for light with a wavelength of 0.55 m on the basis of the index distribution shown in FIG. 13.

If transparent electrodes 42, 43, 44 are disposed on and under a liquid crystal layer 41, as shown in FIG. 8, and a voltage is applied, liquid crystal molecules in regions 45, 46 are rotated in accordance with the voltages applied, and, for example, the index changes shown in FIG. 14 take place according to the angles of rotation. When it is thought that a liquid crystal is a dielectric substance, it can be seen that the formation of a liquid crystal layer between two electrodes means the formation of a capacitor. In such a capacitor, an electrical field is always produced between the two electrodes when a voltage is applied to the portion between the two electrodes, as well as a leakage electrical field being produced at the ends of the electrodes. This leakage electrical field is described in, for example, "Electromagnetics" (page 145) by Shigeo Umoto (issued by Shoko-do).

The strength of the electrical field leakage increases in proportion to the increase in the voltage applied to the portion between the electrodes, and the liquid crystal molecules in the regions 47, 48 shown in FIG. 8 are also rotated and produce index changes. In addition, the strength of the leakage electrical field decreases in the manner of an exponential function with any changes in the distance from the electrode ends.

Figure 9A:
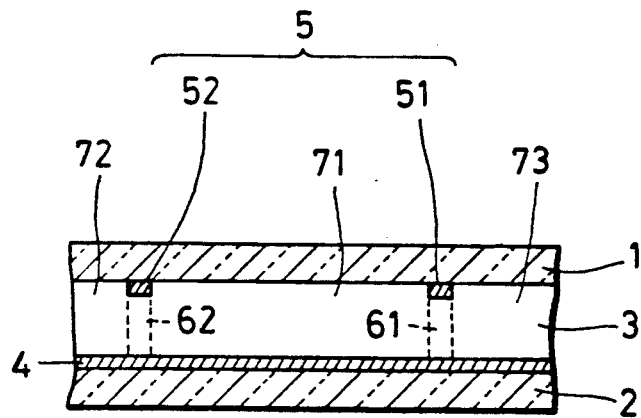
FIGS. 9(A) and 9((B) are explanatory views of examples of the method of forming a phase grating of the present invention.

FIG. 9A is an explanatory view of an embodiment of the method of forming a phase grating of the present invention. In the drawing, reference mumerals 1, 2 respectively denote transparent base plates; reference numeral 3, a liquid crystal; reference numeral 4, a first electrode which is completely and uniformly transparent; and reference numeral 5, a second electrode having a plurality of transparent electrodes 51, 52 arranged in a lattice form.

In this embodiment, the width of each of the electrodes 51, 52 in the direction of the array thereof smaller than the period of the array l (pitch of the array l) to a sufficient degree, and is as small as about 1/5 to 1/20 of the period l of the electrodes. The width of the electrodes 51, 52 is smaller than the space between the electrodes 51, 52. With a width over 1/5 of the period l, as described hereinafter, it is difficult to form a good phase diffractive grating by the liquid crystal 3. With a width under 1/20 of the period l, the electrical resistances of the electrodes 51, 52 would be increased which would make it difficult to form a uniform field distribution. The value of the width is preferably 2 μm or more.

For example, in this embodiment the period of the array of electrodes 51, 52 is 100 μm and the width of each of the electrodes 51, 52 arranged in a lattice form is 10 μm.

In this construction, for example, a 1-kHz rectangular pulse voltage of 10V in terms of a P-P value is applied to the portion between the first electrode 4 and the second electrode 5. As a result, electrical fields are formed in electrode regions 61, 62 which are the regions formed by the electrodes 51, 52 of the second electrode 5 and the opposite electrode 4. At the same time, leakage of the electrical fields takes place in non-electrode regions 71 to 73 which exclude regions 61, 62 defined by the electrodes 51, 52 and the opposite electrode 4.

Figure 10A:
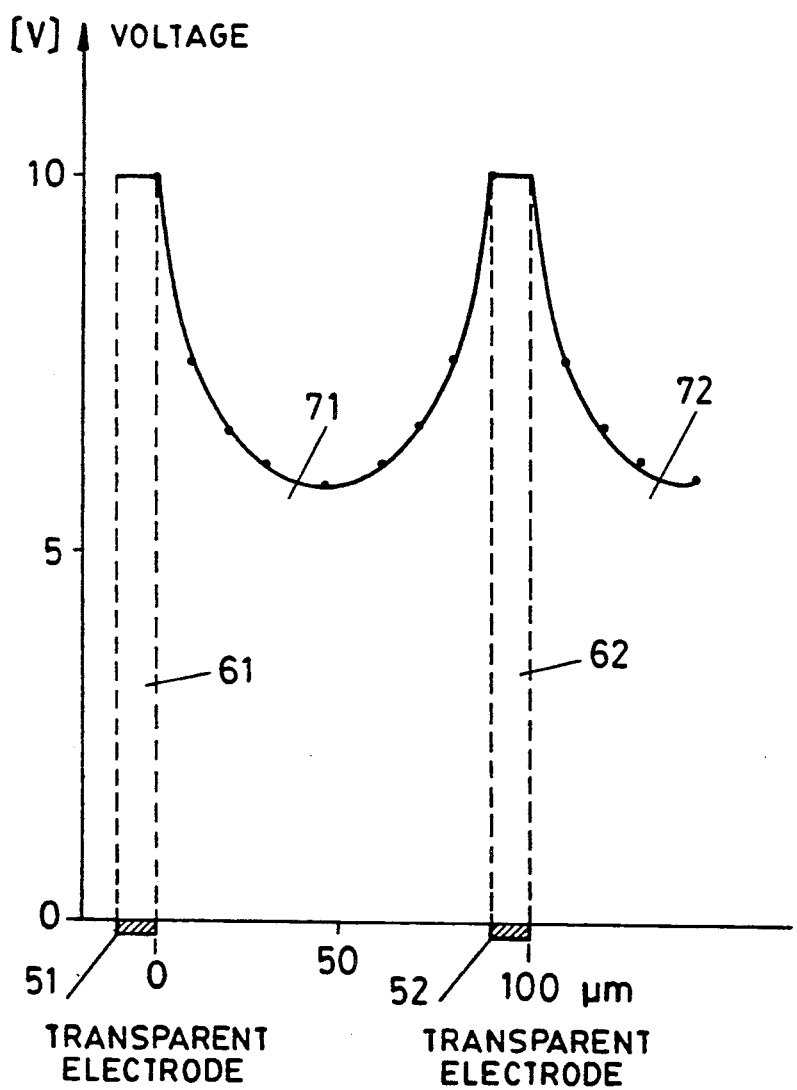
FIG. 10(A) is an explanatory view of the field distribution in which the leakage electrical fields in the liquid crystal cell shown in FIG. 9(A) are represented in terms of voltages (V)

FIG. 10A is an explanatory view of the leakage electrical field expressed in terms of voltage (V). In the drawing, the axis of abscissa is the length in the direction of the array of electrode 51, 52 of the second electrode 5. It will be seen in the drawing that the leakage of the voltage (electrical field) takes place in the non-electrode regions 71, 72 excluding the electrode regions 61, 62.

Figure 10B:
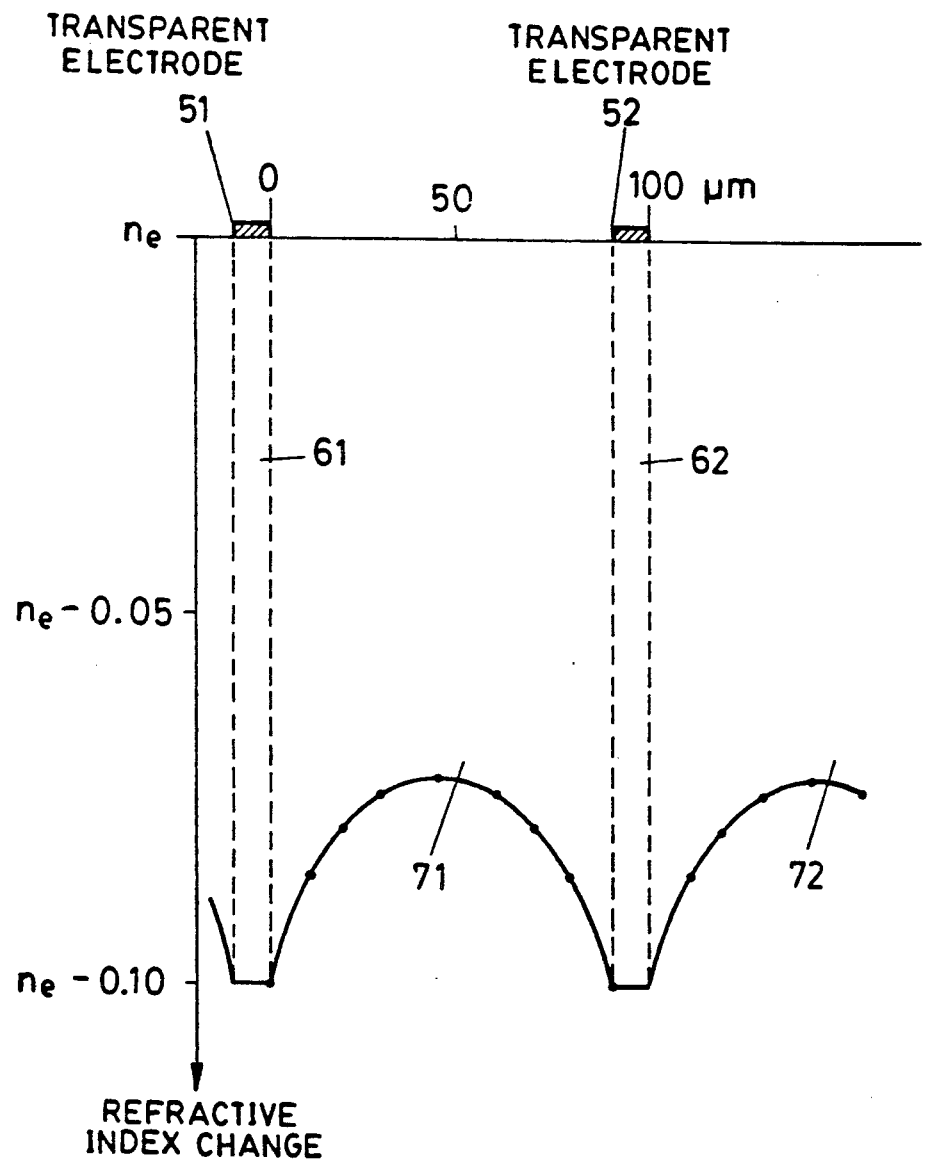
FIG. 10(B) is an explanatory view of the index distribution in the liquid crystal in the liquid crystal cell shown in FIG. 9(A)

FIG. 10B is an explanatory view of the relationship between the changes in the refractive index of the liquid crystal 3 and the electrodes 51, 52 when the electrical field shown in FIG. 10A is applied to the liquid crystal cell shown in FIG. 9A. It can be seen from the drawing that changes in the refractive index take place in the non-electrode regions 71, 72 excluding the electrode regions 61, 62, so as to form as a whole a phase-type diffractive grating in the form of a sine wave.

In this case, the initial state of orientation of the liquid crystal 3 is parallel with the surfaces of the transparent base plates 1, 2 (homogeneous array), this state being achieved by forming orientating films (not shown in the drawing) on the transparent electrodes 4, 5 and rubbing the films. The direction of orientation of the liquid crystal 3 is such that the direction of the long axis of each of the liquid crystal molecules is perpendicular to the direction of the array of the electrodes 51, 52 of the second electrode 5. The state of the homogeneous array is changed into a state of homeotropic array (the long axis of the liquid crystal 3 is oriented in the direction perpendicular to the surfaces of the transparent base plates 1, 2) by applying a voltage.

A nematic liquid crystal ZLI-1694 ($n_e=1.633$, $n_o=1.503$, produced by Merck Co., Ltd.) can be used as the liquid crystal.

As described above, in this embodiment, the electrodes 51, 52 of the second electrode 5 which is one of the opposed electrodes has a lattice form having a given periodic structure and a given width, the leakage electrical fields thereby being formed in the non-electrode regions 71, 72 when an electrical field is applied to the liquid crystal, as shown in FIG. 10A. In addition, the refractive indexes of the liquid crystal in the non-electrode regions 71, 71 are changed in the same way as that in the electrode regions, as shown in FIG. 10B so that a fine and satisfactory phase diffraction grating can be formed.

Furthermore, the amount of leakage of the electrical fields in the present invention depends upon the shape of the electrodes, while it can also be changed by the dielectric constant of the liquid crystal.

If the voltage applied to the region that corresponds to a capacitor formed by a liquid crystal is $V_o$, the charge produced by the application of that voltage is Q, the thickness of the liquid crystal layer is d, the dielectric constant of the liquid crystal is $\epsilon$, and the area of an electrode is S, the strength V of the electrical field in the liquid crystal layer can be expressed by the following equation:

$$V = Qd/(\epsilon S)$$

It can be seen from this equation that, assuming the same voltage is applied, that is, the amount of the leakage electrical field, the apparent strength of the electrical field will decrease as the dielectrical constant becomes larger. It is therefore obvious that a finer phase-type diffractive grating can be formed by utilizing the characteristics of the liquid crystal material itself.

Figure 9B:
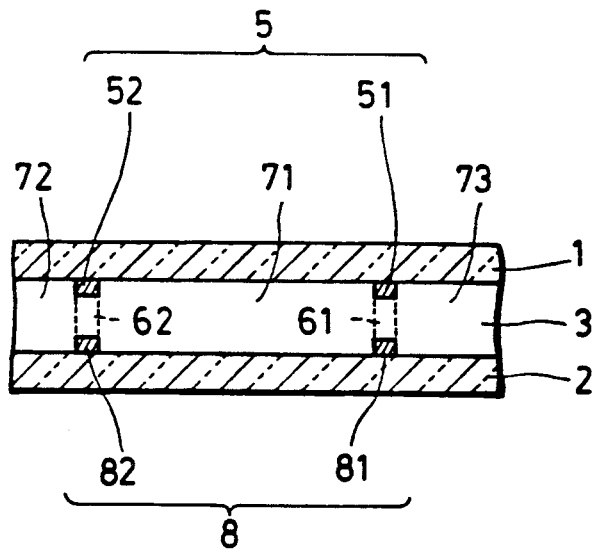

FIG. 9B is an explanatory view of an embodiment which comprises electrodes 81, 82 having a periodic structure and a lattice form with a given width in the same way as that of the second electrode 5 in place of the first electrode 4 shown in FIG. 9A so that the amounts of leakage electrical fields are controlled in the same way as in the embodiment shown in FIG. 9A.

As described above, when the portion between the electrodes 5 and 8 is considered as a capacitor, this embodiment can be seen to produce an effect equivalent to that obtained when the space between the electrodes serving as the capacitor is half that in the embodiment shown in FIG. 9A, whereby a finer phase-type diffractive grating can be obtained.

Figure 11A:
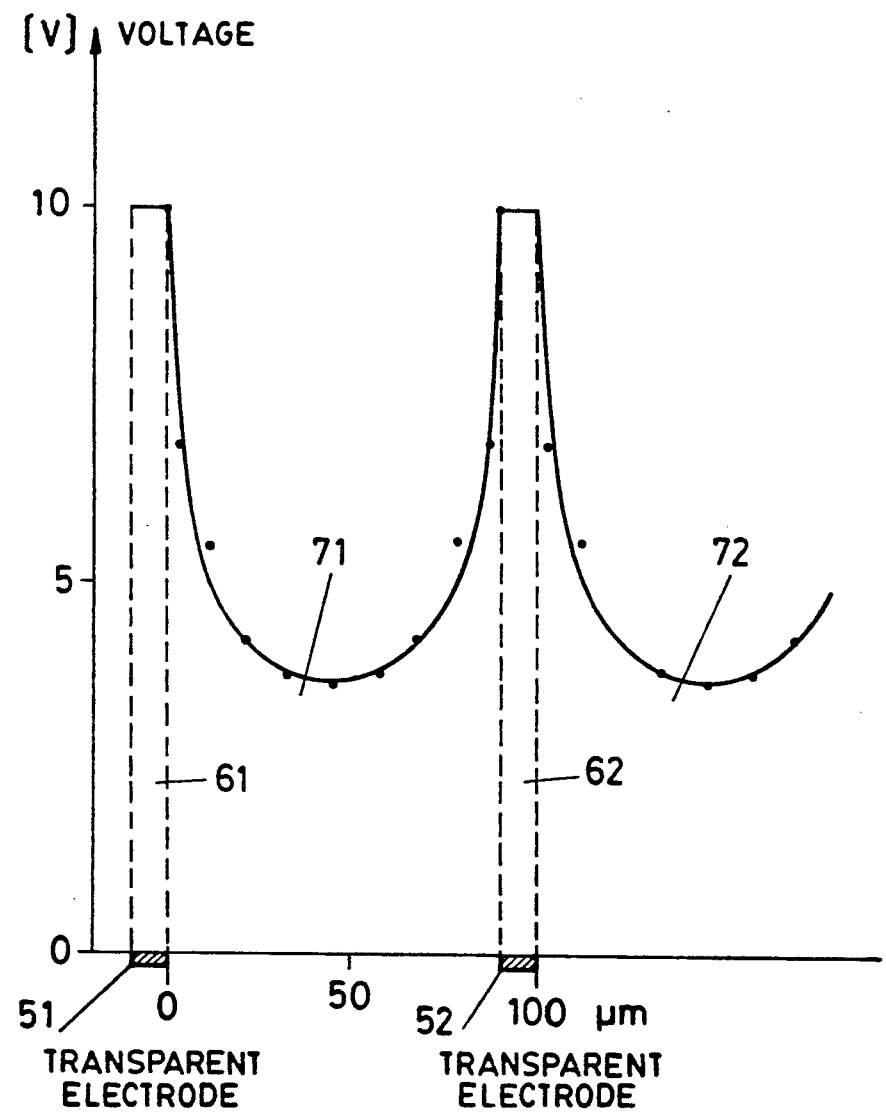
FIG. 11(A) is an explanatory view of the field distribution in which the leakage electrical fields in the liquid crystal cell shown in FIG. 9(B) are represented in terms of voltages (V)
Figure 11B:
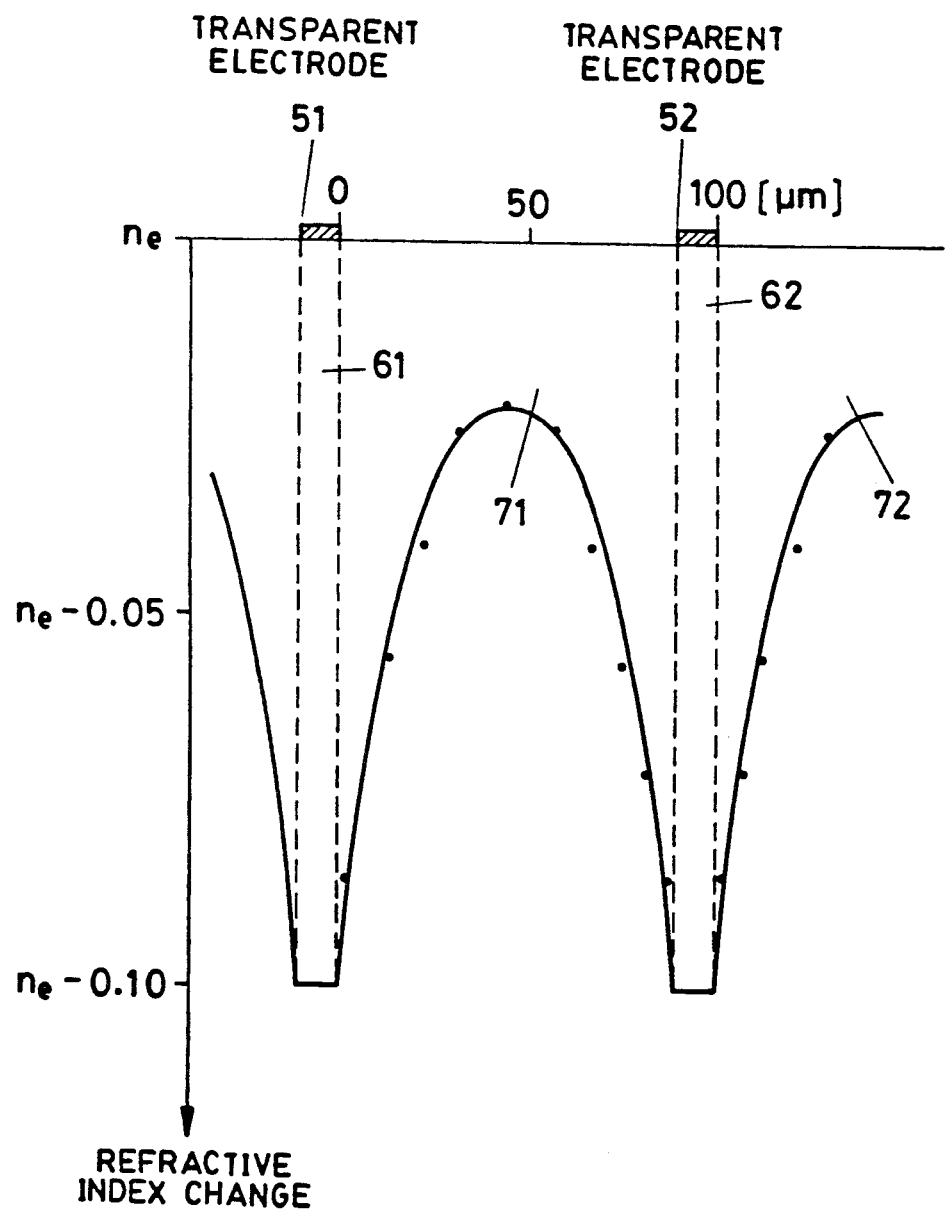
FIG. 11(B) is an explanatory view of the index distribution in the liquid crystal in the liquid crystal cell shown in FIG. 9(B)

FIG. 11A shows the state of leakage electrical fields at the ends of the electrodes in the liquid crystal cell shown in FIG. 9B in terms of voltage, i.e., in the same form as that utilized in FIG. 10A. FIG. 11B shows changes in the reffractive indexes which are in the same form as that utilized in FIG. 10B.

This embodiment comprises the two opposed electrodes 5, 8 which both have a periodic lattice form and are disposed opposite to each other sandwiching the liquid crystal 3 so that the leakage of the electrical fields is narrowed, a finer and more satisfactory phase-type diffraction grating thus being formed.

In this embodiment, if the period of the phase-type diffractive grating is about 100 μm or less, the width of each of the electrodes must be made small and, when required, may have to be as small as, for example, 20 μm or less. However, since such a reduction in the width of each electrode increases the resistance in each electrode portion, it is preferable to use electrodes formed of metals such as copper having a low degree of resistance as occasion demands.

Although each of the embodiments shown in FIGS. 9A and B concerns a one-dimensional phase-type diffractive grating, transparent electrodes each having a two-dimensional periodic structure may, as a matter of course, be used instead.

In addition, electrodes may be arranged in a two-dimensional manner in a lattice form with different periods in the two orthogonal directions so that a two-dimensional phase-type diffractive grating is formed.

Figure 12A:
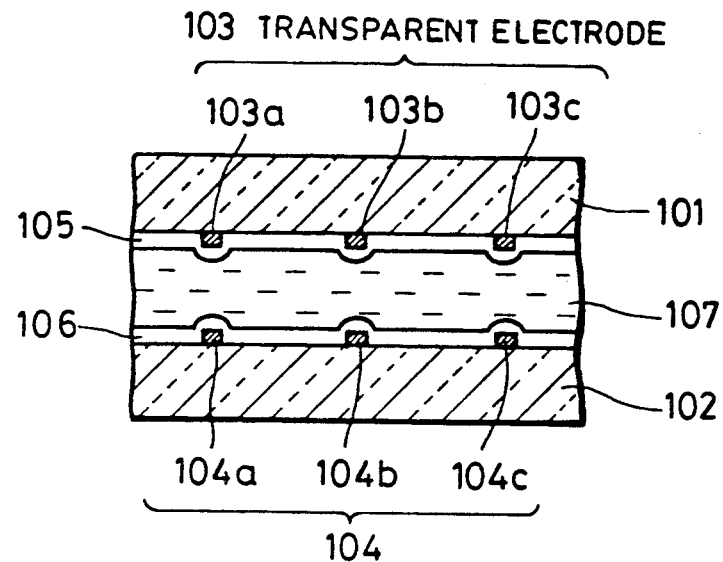
FIG. 12(A) is a sectional view of an example of the liquid crystal cell constituting a focusing plate of the present invention.
Figure 12B:
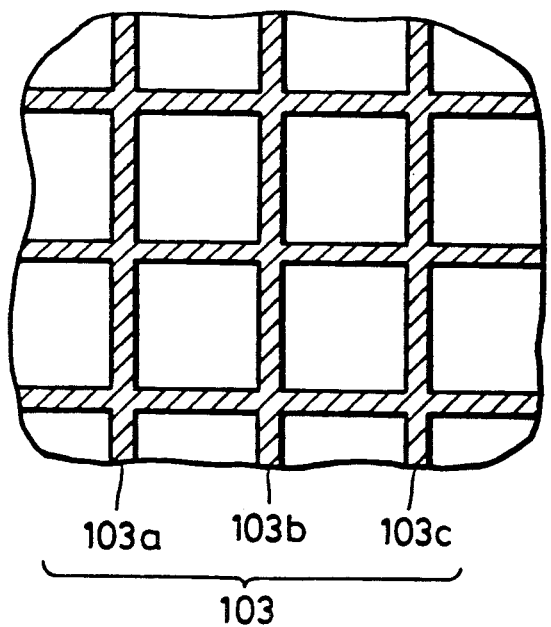
FIG. 12(B) is a plan view of the structure of transparent electrodes in the liquid crystal cell shown in FIG. 12(A)

FIG. 12A is a sectional view of an example of the liquid crystal cell constituting the focusing plate of the present invention, and FIG. 12B is a plan view of the structure of the transparent electrodes in the liquid crystal cell shown in FIG. 12A. In FIG. 12A, reference numerals 101, 102 denote transparent glass base plates on which the transparent electrode 103 shown in FIG. 12B and a transparent electrode 104 having the same form as that of the electrode 103 are formed opposite to each other. Orientating films 105, 106 are also formed so as to cover these transparent electrodes. The orientated films 105, 106 are used for the initial orientation of a liquid crystal layer 107 and, for example, a polymeric material such as polyimide is spin-coated and then subjected to rubbing treatment with a velvet in a given direction so that the liquid crystal molecules are homogeneously orientated substantially in parallel with the base plates.

This embodiment mainly aims at effectively utilizing the effect of the leakage fields at the ends of the electrodes. Hence, the embodiment comprises the transparent electrodes 103, 104 which each have a width that is as small as possible compared with the period of the structure thereof.

Figure 13:
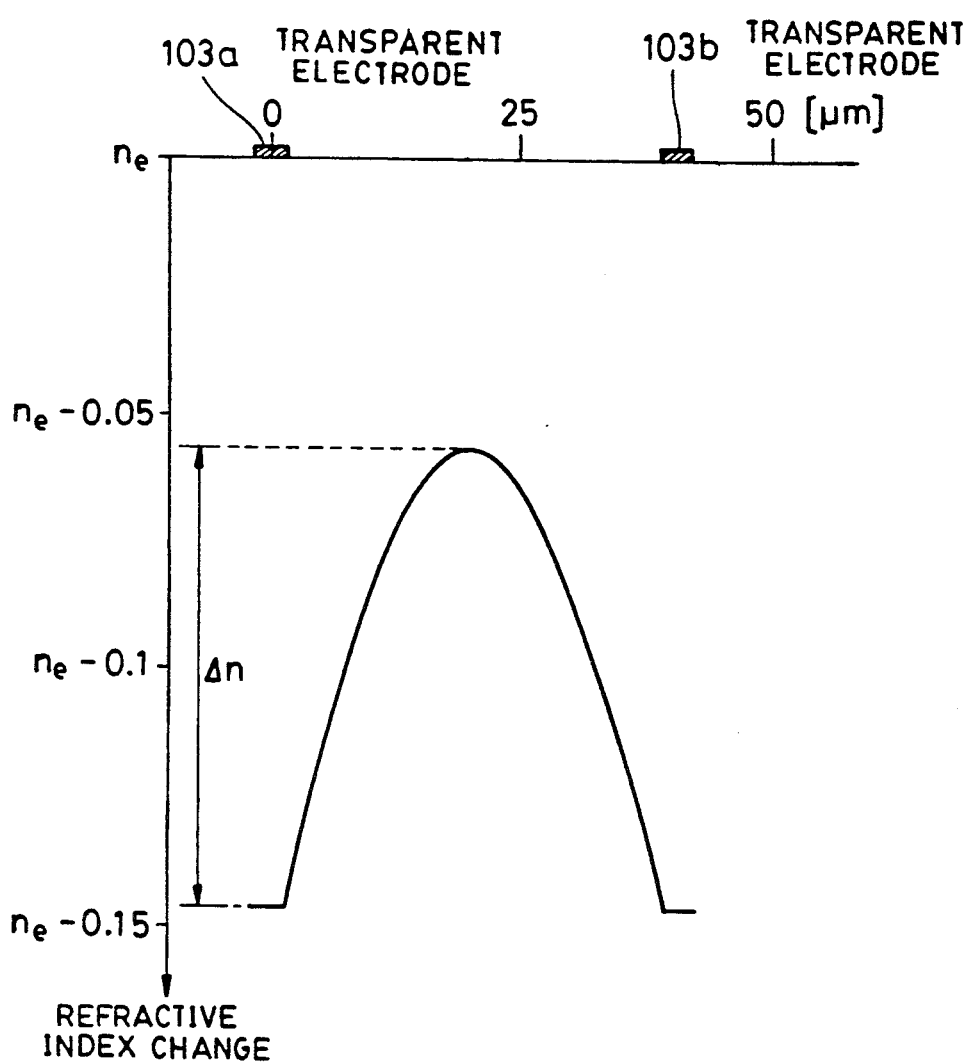
FIG. 13 is an explanatory view of the index distribution of the liquid crystal in the liquid crystal cell shown in FIG. 12(A)

In the embodiment, a nematic liquid crystal RO-TN-2108 produced by Roche Co., Ltd. ($n_e=1.78$, $n_o=1.50$) is used as the liquid crystal 107, the period of electrodes 103a, 103b, etc. is 40 μm, and the width of each of the electrode is 3 μm. When a pulse voltage of 8 V in terms of the P-P value in a 1-kHz rectangular wave is applied to the portion between the transparent electrodes 103, 104, the liquid crystal molecules are rotated due to the leakage electrical fields produced between the transparent electrodes 103a, 103b, producing changes in the refractive index. FIG. 13 is a graph showing the changes in the refractive index. It can be seen from FIG. 13 that the maximum value Δn of the index changes of the liquid crystal 107 between the transparent electrodes 103a, 103b is 0.09. In this embodiment, the transparent electrodes 103, 104 are so disposed as to have a spacing of about 20 μm by using a spacer (not shown) for this purpose.

FIG. 14 shows the contours of the phase changes for light with a wavelength of 0.55 μm at Δn=0 when the distribution shown in FIG. 13 is produced by using the electrode shown in FIG. 12B. The maximum phase change in FIG. 14 is about 3λ.

On the other hand, since the changes in phase of a conventional relief-type focusing plate, that is, the heights of irregularity, are 1.5 to 2.2 μm, and the refractive index of an acrylic base plate serving as a focusing plate is about 1.5, $$n_d = (n-1)d = 0.5 \times 1.5 \text{ to } 0.5 \times 2.2$$
$$= 0.75 \text{ to } 1.1 \ (\mu m)$$

namely, $\Delta n_d = 1.4\lambda$ to $2\lambda (\lambda = 0.55 \ \mu m)$.

It is therefore possible to obtain a satisfactory value as an index change produced by the liquid crystal and to obtain a desired phase change by controlling the voltage applied. At the same time, it is possible to form the same distribution of phase changes as that obtained by the conventional focusing plate shown in FIGS. 4 and 5.

Figure 15:
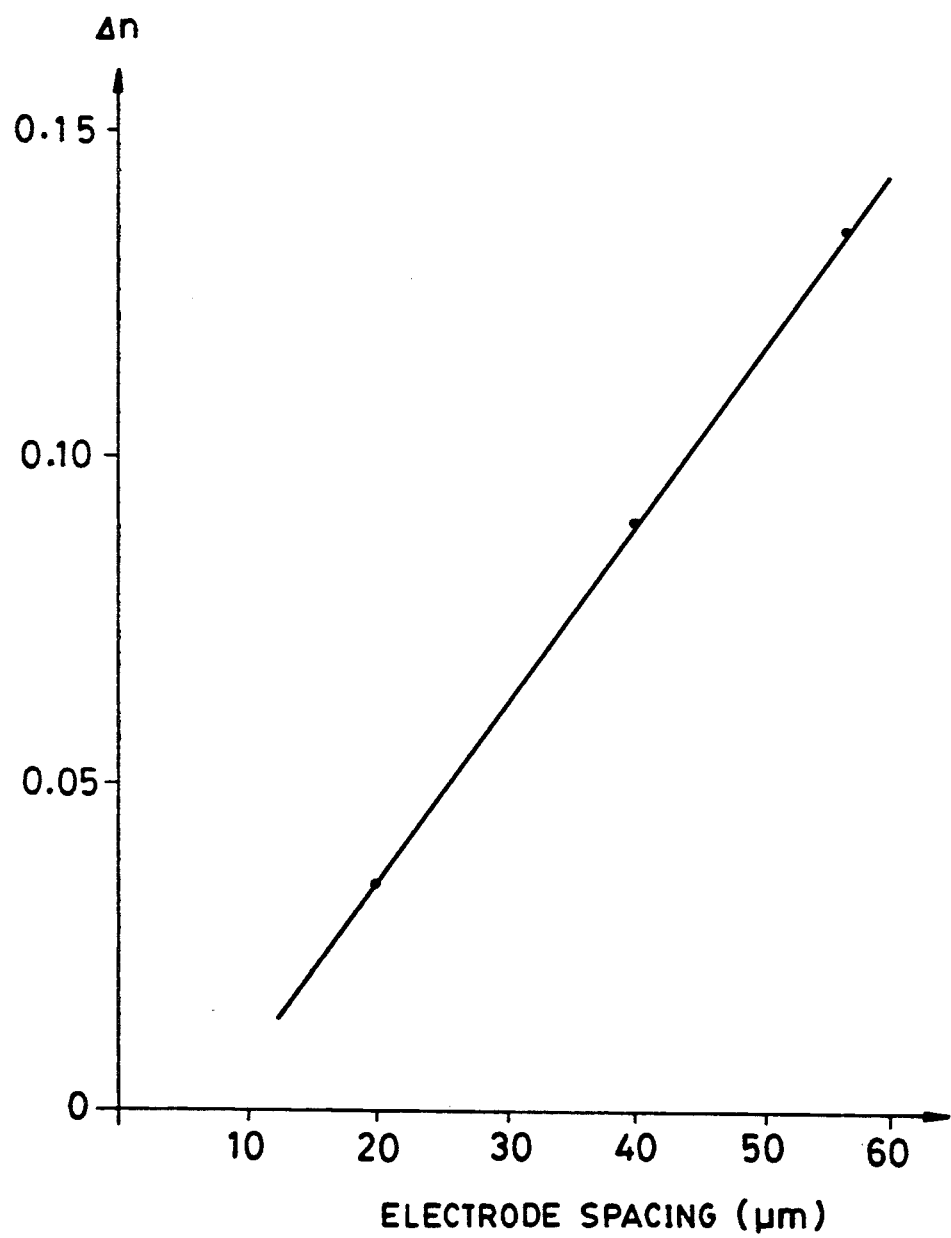
FIG. 15 is a graph showing the relationship between the electrode spacing and the maximum value of the index change in the liquid crystal cell shown in FIG. 12(A)

FIG. 15 is a graph of the changes in the maximum value Δn of the index changes obtained by applying a voltage with the changes of the electrode spacing of the grating in the same structure as that shown in FIGS. 12A, 12B.

Figure 16:
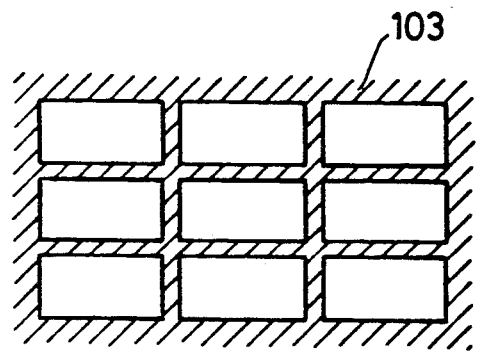
FIGS. 16 and 17 are respectively schematic drawings of other structures of the transparent electrode of the liquid crystal cell.
Figure 17:
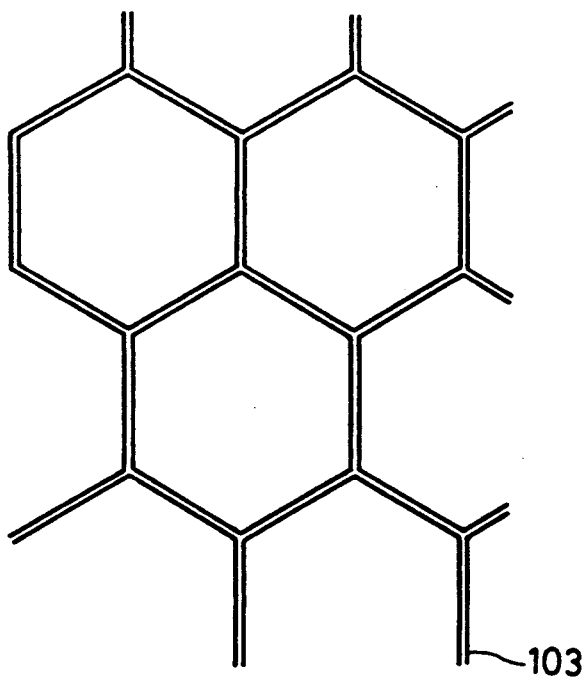

When it is considered that a phase change of 1.4λ or more for light with a wavelength of 0.55 μm is sufficient for a focusing plate, if the thickness of the liquid crystal layer is 25 μm, an electrode spacing of 18 μm or more can cope with such a phase change. In this case, a namtatic liquid crystal RO-TN-2108 produced by Roche Co., Ltd. ($n_e=1.78$, $n_o=1.50$) was used as the liquid crystal. In addition, since the phase change can be expressed by $\Delta n_d$, a desired phase change can be substantially obtained by selecting the thickness of the liquid crystal layer and the kind of the liquid crystal material and adjusting the electrode spacing and the voltage to be applied. Furthermore, since the indexes between the electrodes are substantially the same, the width of each of the electrodes must be as small as possible as compared with the period thereof. To achieve this requirement, it is preferable that the width is most 1/5 of the period. However, when ITO issued as each transparent electrode, if the line width of the electrode is made to small, the resistance thereof is increased, and a uniform electrical field distribution cannot be formed over the entire surface of the electrode. It is therefore required that the line width of each electrode is 2 μm or more. Each of the transparent electrodes may have the structure shown in FIG. 12B in which the period in the longitudinal direction is substantially equal to that in the lateral direction, the structure shown in FIG. 16 in which the period in the longitudinal direction differs from that in the laterial direction, or the hexagonal form shown in FIG. 17.

When, in this way, the phase diffraction grating is formed by the leakage electrical fields from the ends of the electrodes, and a focusing plate is formed by using this phase grating, it is possible to sufficiently observe the image of an object and to control the diffusion property of the focusing plate, without bringing about any deterioration of the quality due to visible turbulence which is caused when a conventional dynamic scattering-type liquid crystal is used.

A description will now be made of another embodiment of the present invention.

In this embodiment, two or more regions with different periods of index changes are formed in a focusing plate using a liquid crystal so that phase changes of the phase diffraction grating in the periphery of the focusing plate are smaller than those in a central portion thereof. Therefore, the diffusivity in the periphery is controlled, and any reduction in the quantity of light in the periphery due to the broadening of the diffused light, whereby a object image having uniform brightness over the entire surface of the focusing plate can be formed.

Figure 18A:
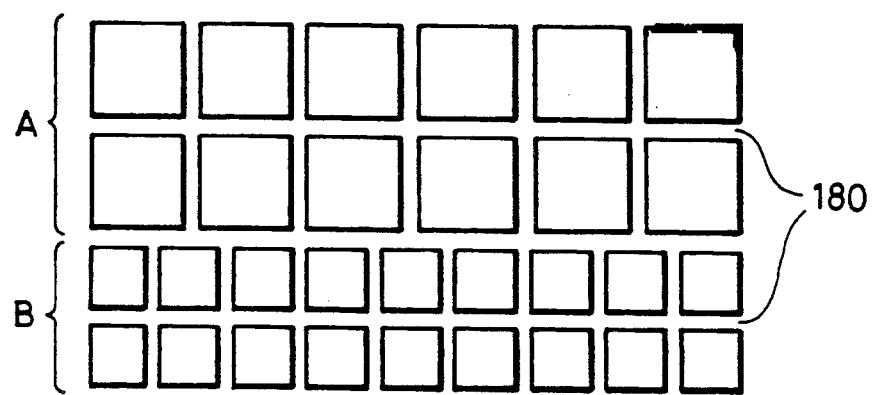
FIGS. 18(A) and 18(B) are explanatory views of another embodiment of the focusing plate of the present invention.
Figure 18B:
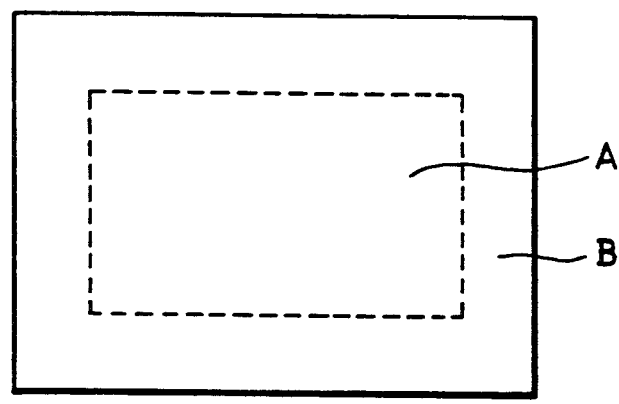

FIG. 18A is an enlarged plan view of the boundary portion between two regions in an electrode pattern of the focusing plate of still another embodiment of the present invention and is an enlarged view of a portion in the entire surface shown in FIG. 18B. In the two drawings, A denotes a region with a large electrode period which occupies a central portion of the focusing plate, and B dentoes a region with a small electrode period which occupies the peripheral portion of the focusing plate. In the drawings, reference numeral 180 denotes an electrode portion. The structure of a liquid crystal cell itself is the same as that shown in FIG. 12A. A nematic liquid crystal RO-TN-2108 produced by Roche Co., Ltd. is used and held between base plates at a distance of about 20 μm which each have en electrode having an orienting film on the upper surface thereof. In addition, in FIG. 18B, the period of electrodes in the region A is about 40 μm, the period of electrodes in the region B is about 30 μm and the width of each of electrodes is about 3 μm.

Figure 19:
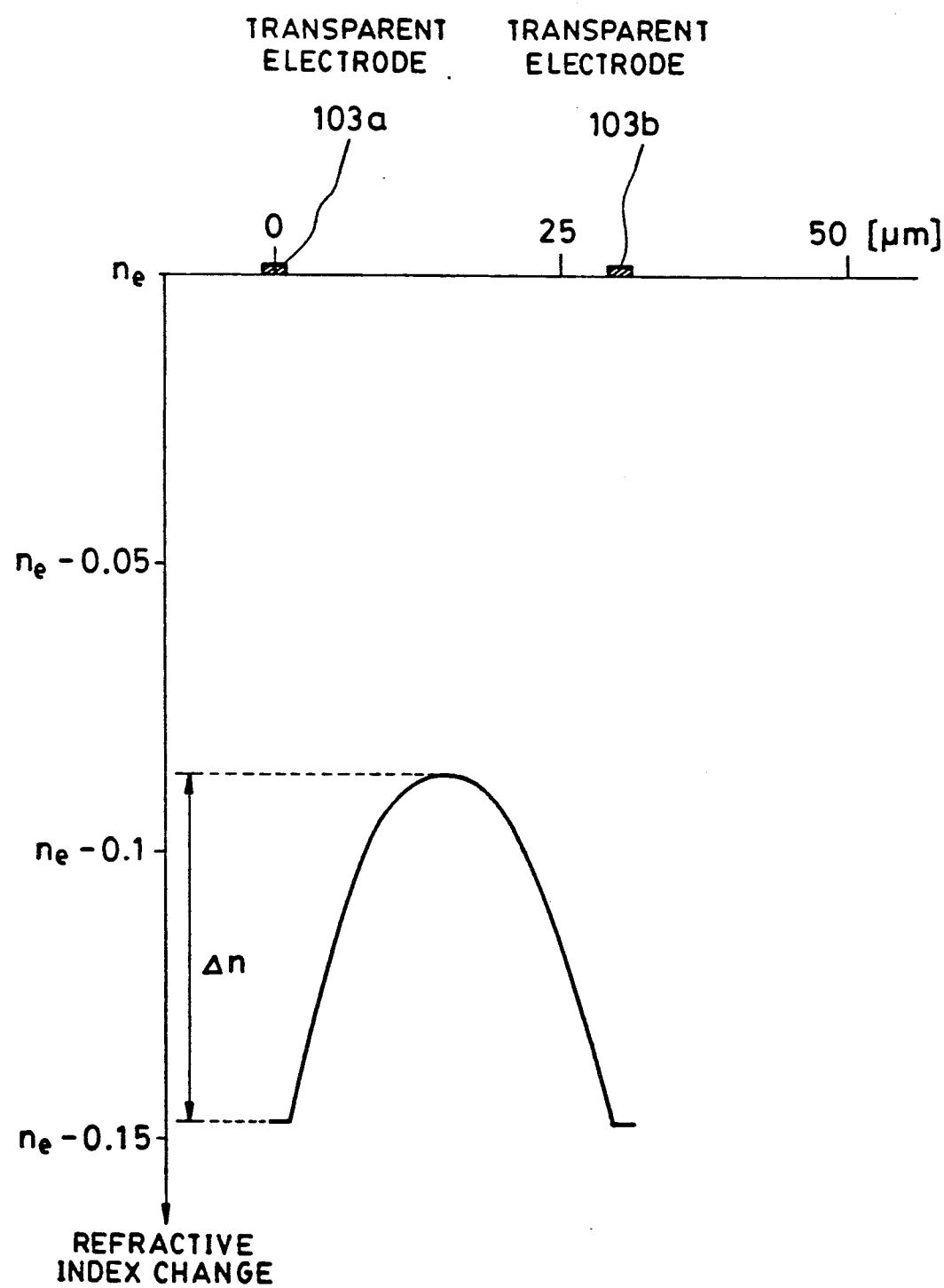
FIG. 19 is a drawing of the index distribution of the liquid crystal produced in the region B shown in the FIGS. 18(A) and 18(B)

FIG. 19 shows the index changes with a period of 30 μm in the region B when a pulse voltage of 8V in terms of the P-P value is applied to the portion between the electrodes on both sides by using a 1-kHz rectangular wave. In this case, Δn in the region B is about 0.06 and Δn in the region A is 0.09 which is the same as that with a conventional focusing plate. Therefore, the maximum phase changes in the regions A and B are about 3λ and 2λ (λ:wavelength), respectively. As a result, it is possible to provide a focusing plate in which any reduction in the light quantity in the peripheral portion is controlled.

It is also possible to obtain a desired phase change by controlling the voltage to be applied and to provide a focusing plate using a liquid crystal showing a suppressed reduction in the quantity of light in the peripheral portion thereof and variable diffusivity.

Figure 20A:
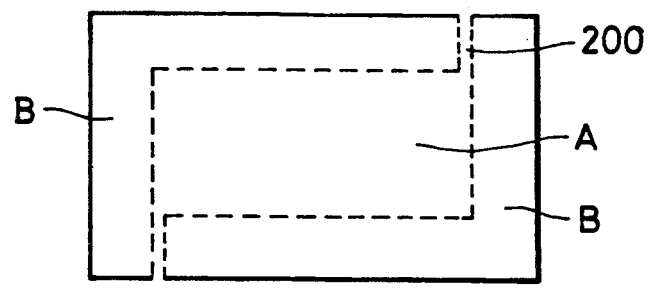
FIGS. 20(A) and 20(B) are explanatory views of a further embodiment of the focusing plate of the present invention.
Figure 20B:
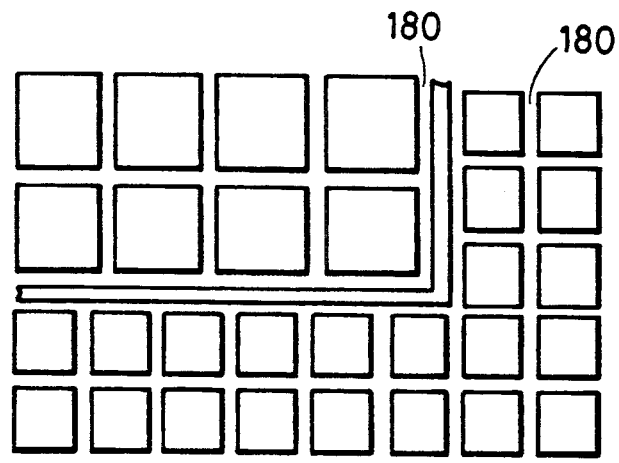

FIGS. 20A and 20B are plan views of a focusing plate of a still further embodiment of the present invention and an enlarged plan view of the boundary portion between two regions of an electrode pattern, respectively. In the drawings, portion A denotes a region having a large period of electrodes and portion B denotes a region having a small period of electrodes. In the drawings, reference numeral 180 denotes an electrode portion, and reference numeral 200 denotes a portion where leading electrodes for the region A are formed. In addition, this embodiment has the cell structure shown in FIG. 12A in the same manner as that in the embodiment shown in FIGS. 18A, 18B. When the focusing plate of this embodiment was driven in the same manner as those in the above-described embodiments, the maximum phase change obtained was the same as that obtained in each of the above-described embodiments. In this embodiment, the regions A and B can be individually driven so that the diffusivity in the peripheral portion can be freely controlled as compared with the central portion. Therefore, even if this focusing plate is used in a camera equipped with an optical system such as a zoom lens in which the position of an entrance pupil changes, it is possible to control the entire surface of the focusing plate to have uniform brightness.

Figure 21:
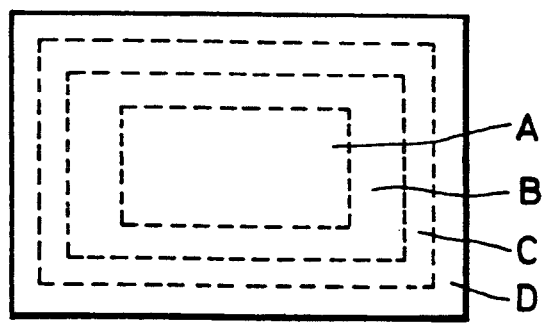
FIG. 21 is an explanatory view of still another embodiment of the focusing plate of the present invention.

FIG. 21 is a plan view of still further embodiment of the present invention in which portions A to D respectively denote regions with different degrees of diffusivity. The degrees of diffusivity increase in the direction toward a central portion of the drawing. Such an increase in the number of regions with different periods of electrode patterns can make the diffusion distribution from the center to the periphery smooth and make the brightness more uniform.

In addition, as shown in the drawing, if a leading electrode 200 is provided on each of the regions and the electrical filed to be applied to each of the regions is individually controlled by a controller (not shown), it is possible to provide part of the focusing plate alone with diffusivity. If this focusing plate is used in a camera so as to provide the peripheral portion alone with diffusivity, it is also possible to perform focusing in the peripheral portion while observing an object image in a transparent central portion. Namely, it is possible to selectively provide only a portion necessary for focusing with diffusivity.

In addition, each of the leading electrodes 200 can also be formed by the method described below, as shown in the embodiment below. A plate having through holes is used as each of the base plates, and a conductive material layer consisting of a transparent electrode material or a metal material is formed in each of the through holes. When such leading electrodes are used, since electrode portions need not be formed on the surface of an electrode pattern, it is possible to obtain more uniform diffusivity and thus provide a high-quality focusing plate.

As described below, in a focusing plate used for observing an object image which uses a liquid crystal, when phase changes in the peripheral portion is made smaller than that in the central portion, it is possible to control the diffusivity in the peripheral portion and thus provide a focusing plate which can form an object image with uniform brightness.

Figure 22A:
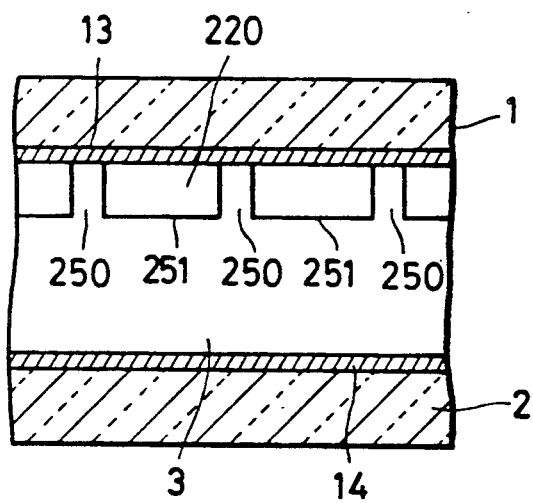
FIG. 22(A) is a sectional view of a liquid crystal cell of a still further embodiment of the focusing plate of the present invention.
Figure 22B:
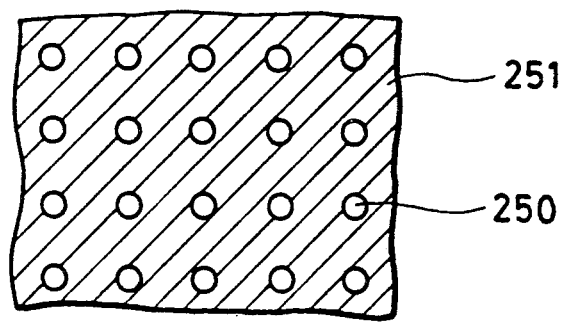
FIG. 22(B) is a partial plan view of a pattern of insulating layers in the liquid crystal cell shown in FIG. 22(A)

FIG. 22A is a schematic sectional view of a liquid crystal cell of another embodiment of the focusing plate of the present invention. In the drawing, reference numerals 1, 2 each denote a transparent electrode; reference numeral 3, a liquid crystal layer; reference numerals 13, 14, a first and second transparent electrode which are wholly uniform and transparent plate electrodes. Reference numeral 220 denotes an insulating layer which is provided on the surface of the first transparent electrode 1, for example, so that non-insulating layer portions 250 having a given pattern remains, as shown in FIG. 22B. In the drawing, reference numeral 251 denotes insulating layer portions.

In this embodiment, the non-insulating layer portions 250 each have a circular form having a diameter of about 5 μm and are formed with a period of 30 μm.

A nematic liquid crystal ZLI-1694 ($n_e=1.633$, $n_o=1.503$, produced by Merck Co., Ltd.) is used as the liquid crystal so that the thickness is about 15 μm. The insulating layer portions 220 are formed by magnetron sputtering of $Ta_2O_5$ so that the thickness thereof is 5 μm. This patterning is performed by a known lift-off method.

The initial orientation of the liquid crystal is performed by rubbing the orienting films (not shown) formed on the transparent electrodes 13, 14 and the insulating layer 220 so that the directions of orientation of the liquid crystal molecules are parallel with the surfaces of the base plates 1, 2. The size of the portion where the phase-type diffraction graing is formed is 100 mm × 60 mm.

In this embodiment, 1-kHz rectangular pulse voltage of 20V in terms of the P-P value was applied to the portion between the first transparent electrode 13 and the second transparent electrode 14. At this time, electrical fields are formed in the electrode regions formed by the second transparent electrode 14 and the opposed non-insulating portions 250. At the same time, leakage of the electrical fields take place in the non-electrode regions formed by the second transparent electrode 14 and the opposed insulating layer portions 251. When the refractive index of the liquid crystal in such a configuration having the electrode regions and the non-electrode regions is changed by controlling the amount of the electrical field to be applied, this embodiment can obtain a phase-type diffraction grating which shows the maximum refractive index change of 0.03.

In the liquid crystal cell of this embodiment, it is also possible to form the distribution of refractive indexes shown in FIG. 10B, 11B, 13 or 19 in the liquid crystal 3 and to form a phase-type diffraction grating with the form of a sine wave.

In this embodiment, an insulating layer is so provided that non-insulating portions of a given pattern is formed on the surface of at least one of the electrodes opposite to each other, and leakage of the electrical fields is produced in the non-insulating regions by applying an electrical field to the liquid crystal through the non-insulating portions, whereby a good phase diffractive grating having a fine pitch is obtained.

In addition, in the liquid crystal cell of this embodiment, an insulating layer may be provided so that the same pattern as that formed on the first transparent electrode 13 is formed on the second transparent electrode 14. In this case, the insulating layer is formed by patterning it on each of the base plates 1, 2 in such a manner that the insulating layer portions 251 and the non-insulating layer portions 250 on the base plate 1 respectively correspond to those on the base plate 2.

Figure 23:
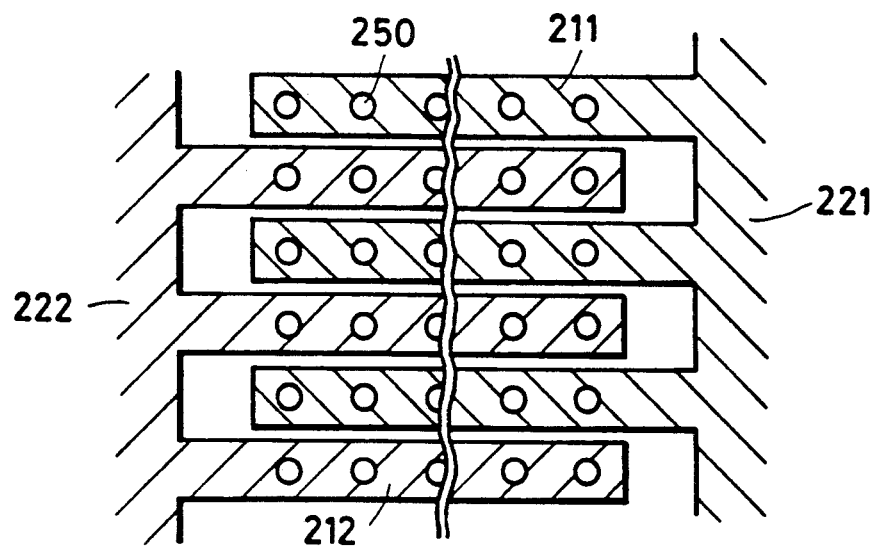
FIG. 23 is an explanatory view of a modification of the liquid crystal cell shown in FIG. 22(A)

FIG. 23 shows a modification of the liquid crystal cell shown in FIG. 22A and is an explanatory view of the pattern of the non-insulating layer portions formed on one of the transparent electrodes.

In this embodiment, voltage-applied electrodes 211 as well as earth electrodes 212 are formed on the first transparent electrode. The width of each of the electrodes is about 12 μm. In this drawing, reference numeral 250 denotes non-insulating layer portions each having a circular form; reference numeral 221, a leading portion for the voltage-applied electrodes; and reference numeral 222, a leading portion for the earth electrodes.

In this embodiment, the diameter of each of the circular non-insulating layer portions 250 is about 5 μm in the same manner as that in the above-described embodiment, and the non-insulating layer portions 250 are formed at a pitch of 30 μm. In addition, other portions in the cell are the same as those of the above embodiment. The thickness of the insulating layer is 4 μm, the thickness of the liquid crystal layer is 15 μm, and the size of the portion where a phase-type diffraction grating is formed is 80 mm×80 mm. A liquid crystal RO-TN-2108 (trade name, produced by Roche Co., Ltd.) is used as the liquid crystal. The orientation of the liquid crystal is effected by rubbing treatment of orienting films (not shown) so that the directions of orientation in the upper and lower surfaces of the liquid crystal are parallel with the surfaces of the base plates.

A 1-KHz rectangular pulse voltage of 20V in terms of the P-P value was applied to the portions between the voltage-applied electrodes 211 and the earth electrodes in the first electrode group and the portions between the voltage-applied electrodes 211 and the second electrode. At this time, a phase grating comprising the liquid crystal showed the maximum index change of 0.06 in the portions between the electrode regions and the non-electrode regions (non-insulating layer portions).

Figure 24:
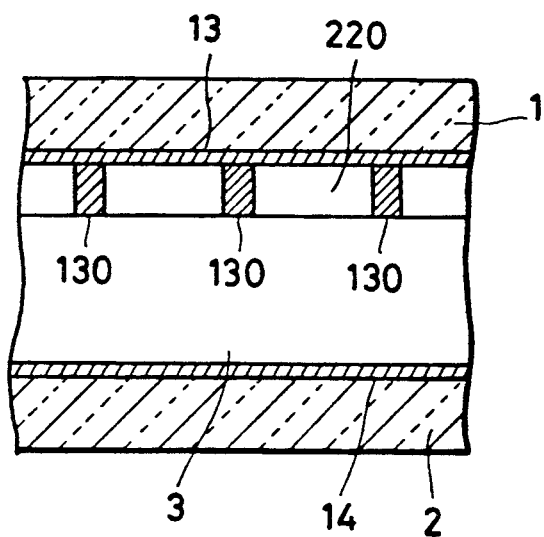
FIG. 24 is a sectional view of another modification of the liquid crystal cell shown in FIG. 22(A)

FIG. 24 is a sectional view of a liquid crystal cell showing another modification of the liquid crystal cell shown in FIG. 22A.

In this embodiment, transparent electrodes 130 each having the same thickness as that of an insulating layer 220 are formed by a lift-off method. The electrode pattern of the transparent electrodes 130 and the pattern of the insulating layer are the same as those in the embodiment shown in FIG. 23. The insulating layer 220 was formed by electron beam vapour deposition of $Al_2O_5$ so as to have a thickness of 4 μm. The transparent electrodes 130 with about 5% of $SnO_2$) so as to have the same thickness as that of the insulating layer. The refractive indexes of the insulating layer 220 and the ITO transparent electrode 130 were set at about 1.7 by appropriately controling the conditions of the formation thereof. A liquid crystal RO-TN-2108 (trade name, produced by Roche Co., Ltd.) was used as the liquid crystal.

In addition, in this embodiment, the orientation of the liquid crystal is effected by rubbing orienting films (not shown) so that the directions of orientation in the upper and lower surfaces thereof were the same as each other. When a voltage of 15V (P-P value) was applied to the portions between the voltage-applied electrodes and the earth electrodes in the first electrode group and the portions between the voltage-applied electrodes and the second electrode by using a rectangular pulse with a frequency of 1 kHz, it is possible to form a phase-type diffraction grating exhibiting the maximum index change in each of the regions between the portions where no insulating layer is formed, uniformly over the entire surface.

In this embodiment, since the insulating portions and the transparent electrode portions additionally formed have substantially the same refractive indexes, the phase changes in these portions are small, and sight in a transparent state was thus improved. In addition, since there is substantially no stages between the insulating portions and the ITO portions, the use of thin oriented films produces a reduced degree of irregular orientation, and the use of oriented films with a thickness of 1000A enables good orientation treatment.

Figure 25:
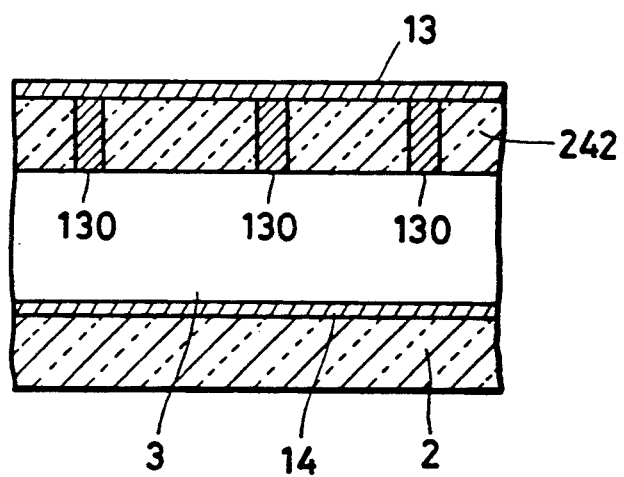
FIG. 25 is a sectional view of a further modification of the liquid crystal cell shown in FIG. 22(A).

FIG. 25 is a sectional view of a liquid crystal cell showing a still another modification of the liquid crystal cell shown in FIG. 22A. In the drawing, reference numeral 242 denotes an insulating transparent base plate having through holes and an transparent electrode 13, and a transparent electrode material 131 is charged in the through holes to form a first electrode. The electrode portion is the same as that in the above-described embodiment and the diameter of each of circular portions is about 5 μm, the circular portions being formed with a period of 30 μm. A liquid crystal RO-TN-2108 (trade name, produced by Roche Co., Ltd.) was used. The method of orienting the liquid crystal is the same as that in the above embodiment. The thickness of the liquid crystal is 20 μm.

When a rectangular pulse voltage of 20V (P-P value) was applied to the portions between the voltage-applied electrodes in the first electrode group and the earth electrodes therein and the portions between the voltage-applied electrodes and the second electrode, it was possible to form a phase-type diffraction grating showing the maximum index change of 0.12 in the portions between the regions, where no insulating layer was formed, uniformly over the entire surface of the grating.

As described above, when an insulating layer having the configuration described above is provided on the surface of at least one of the electrodes in a liquid crystal cell, it is possible to control differences in the index changes with respect to positions in a cell which are produced when the width of each electrode is small and the length of each electrode is long. In addition, when a voltage is applied to the liquid crystal, a liquid crystal phase grating which can forming a fine and good phase diffractive grating with a desired period of, for example, 50 μm or less can be achieved by forming leakage electrical field in non-electrode regions.

What is claimed is:

1. A focusing plate comprising:
a first base plate having a first electrode pattern;
a second base plate having a second electrode pattern;
a liquid crystal layer held between said first and second base plates; and
means for applying an electric field to said liquid crystal layer by using said first and second electrode patterns;
wherein said first and second electrode patterns are so formed that a predetermined leakage electric field is generated during the application of said electric field to produce a refractive index distribution having a sine wave profile in said liquid crystal layer.

2. A focusing plate according to claim 1, wherein at least said second electrode pattern has a plurality of electrode portions arranged in a direction with a period, and the width of each of said electrode portions is smaller than the spacing between said electrode portions in said direction.

3. A focusing plate according to claim 2, wherein said first electrode pattern consists of a flat electrode.

4. A focusing plate according to claim 2 or 3, wherein the width of each of said electrode portions constituting the periodic structure in the given direction is 1/5 or less of said given period.

5. A focusing plate according to claim 4, wherein the width of each of said electrode portions in said direction is 1/20 or more of said period.

6. A focusing plate according to claim 5, wherein the width of each of said electrode portions in said direction is 2 μm or more.

7. A focusing plate according to claim 4, wherein said period of said electrode pattern in a central portion of focusing plate differs from that in a peripheral portion thereof.

8. A focusing plate according to claim 7, wherein said period in said central portion of said focusing plate is larger than that in said peripheral portion thereof.

9. A focusing plate according to claim 2, wherein said first electrode pattern have a plurality of electrode portions arranged in a direction with a period, and the width of each of said electrode portions is smaller than the spacing between said electrode portions in the given direction.

10. A focusing plate comprising:
a first base plate having a first electrode pattern;
a second base plate having a second electrode pattern;
a liquid crystal layer held between said first and second base plates; and
means for applying an electric field to said liquid crystal layer by using said first and second electrode patterns;
wherein said first and second electrode patterns have a plurality of electrode portions arranged in a direction with a period, and the width of each of said electrode portions is smaller than the spacing between said electrode portions in said direction; and
wherein said second electrode pattern has a configuration which comprises a flat electrode formed on the surface of said base plate in contact with said liquid crystal layer and an insulating layer pattern formed on said flat electrode, and said second electrode pattern comprises insulating layer portions and non-insulating layer portions, said insulating layer portions being arranged with a given period and said non-insulating layer portions serving as said electrode portions.

11. A focusing plate according to claim 10, wherein each of said non-insulating layer portions has a circular form.

12. A focusing plate according to claim 10, wherein each of said non-insulating layer portions comprises a transparent electrode.

13. A focusing plate according to claim 12, wherein the refractive index of each of said transparent electrodes is substantially the same as that of each of said insulating layer portions.

14. A focusing plate according to claim 12, wherein the thickness of each of said transparent electrodes is substantially the same as that of each of said insulating layer portions.

15. A focusing plate according to claim 1 or 10, wherein said liquid crystal layer consists of a nematic liquid crystal.

16. A focusing plate comprising:
a first base plate having a first electrode pattern;
a second base plate having a second electrode pattern;
a liquid crystal layer held between said first and second base plates; and
means for applying an electric field to said liquid crystal layer by using said first and second electrode patterns;
wherein said first and second electrode patterns have a plurality of electrode portions arranged in a direction with a period, and the width of each of said electrode portions is smaller than the spacing between said electrode portions in said direction; and
wherein said second plate has through-going hole portions formed with a given period, and a flat electrode is formed on the surface of said second base plate opposite to the surface of said liquid crystal, said hole portions being filled with a transparent electrode material and thus serving as said electrode portions.

17. A focusing plate comprising:
a first base plate having a first electrode pattern;
a second base plate having a second electrode pattern;
a liquid crystal layer held between said first and second base plates; and
means for applying an electric field to said liquid crystal layer by using said first and second electrode patterns;
wherein said first and second electrode patterns have a plurality of electrode portions arranged in a direction with a period, and the width of each of said electrode portions is smaller than the spacing between said electrode portions in said direction; and
wherein said electrode portions are arranged in two different directions.

18. A focusing plate according to clam 17, wherein the periods of arrangement of said electrode portions in said two directions are different from each other.

19. A focusing plate according to claims 10, 16 or 17, wherein the width of each of said electrode portions in said direction is 2 $\mu$m or more.

20. A focusing plate according to claims 10, 16 or 17, wherein the width of each of said electrode portions in said direction is 1/5 or less of said period.

21. A focusing plate according to claim 20, wherein the width of each of said electrode portions in said direction is 1/20 or more of said period.

22. A focusing plate according to claim 21, wherein the width of each of said electrode portions in said direction is 2 $\mu$m or more.

23. A focusing plate according to claims 10, 16 or 17, wherein said period of said electrode pattern in a central portion differs from that in a peripheral portion.

24. A focusing plate according to claim 23, wherein said period in said central portion of said focusing plate is larger than that in said peripheral portion thereof.

25. A focusing plate comprising:
a first base plate having a first electrode pattern;
a second base plate having a second electrode pattern;
a liquid crystal layer held between said first and said second base plates; and
means for applying an electric field to said liquid crystal layer by using said first and second electrode patterns;
wherein said first and second electrode patterns have a plurality of electrode portions arranged in a direction with a period, and the width of each of said electrode portions being smaller than the spacing between the electrode portions in said direction, and said electrode portions of said first electrode pattern being arranged so as to respectively correspond to said electrode portions of said second electrode pattern; and
wherein an oriented film is formed on each of said first electrode and second electrode patterns so that the direction of the long axis of each of the liquid crystal molecules of said liquid crystal layer is parallel with the opposite surfaces of said base plates when no electric field is applied to said liquid crystal.

26. A focusing plate according to claim 25, wherein said width of each of said electrode portions is 1/5 or less of said period.

27. A focusing plate according to claim 26, wherein said width of each of said electrode portions is 1/20 or more of said period.

28. A focusing plate according to claim 27, wherein said width of each of said electrode portions is 2 $\mu$m or more.

29. A focusing plate according to any of claims 10, 16, 17 or 25 wherein said first electrode patterns consists of a flat electrode.

30. A focusing plate according to any one of claims 10, 16, 17 or 25, wherein said first electrode pattern has a plurality of electrode portions arranged in a direction with a period, and the width of each of said electrode portions is smaller than the spacing between said electrode portions in said direction.

31. A diffusion device comprising:
a first base plate having a first electrode pattern;
a second base plate having a second electrode pattern;
a liquid crystal layer disposed between said first and second base plates; and
means for applying an electric field to said liquid crystal layer by using said first and second electrode pattern;
wherein said first and second electrode patterns are so formed that a predetermined leakage electric field is generated during the application of said electric field to produce a refractive index distribution having a sine wave profile in said liquid crystal layer.

* * * * *

UNITED STATES PATENT AND TRADEMARK OFFICE
CERTIFICATE OF CORRECTION

PATENT NO. : 5,122,888
DATED : June 16, 1992
INVENTOR(S) : Iizuka et al.

It is certified that error appears in the above-identified patent and that said Letters Patent is hereby corrected as shown below:

COLUMN 4:

Line 20, "EMBODIMENT" should read --EMBODIMENTS--.

COLUMN 8:

Line 7, "reffractive" should read --refractive--;

Line 25, "9A and B" should read --9A and 9B--.

COLUMN 9:

Line 38, "nam-" should read -- nem- --;

Line 51, "issued" should read --is used--; and

Line 62, "laterial direction" should read --lateral direction--.

COLUMN 10:

Line 33, "en" should read --an--.

COLUMN 12:

Line 14, "graing" should read --grating--.

UNITED STATES PATENT AND TRADEMARK OFFICE
CERTIFICATE OF CORRECTION

PATENT NO.   : 5,122,888
DATED        : June 16, 1992
INVENTOR(S)  : Iizuka et al.

It is certified that error appears in the above-identified patent and that said Letters Patent is hereby corrected as shown below:

COLUMN 13:

Line 35, "trodes 130 with" should read --trodes 130 were formed by a method of ion plating of ITO ($In_2O_3$) doped with--.; and Line 62, "is" should read --are--.

COLUMN 14:

Line 31, "forming" should read --form--.

COLUMN 15:

Line 9, "have" should read --has--.

Signed and Sealed this

Seventeenth Day of August, 1993

Attest:

BRUCE LEHMAN

*Attesting Officer*    *Commissioner of Patents and Trademarks*